United States Patent
Saitoh

(10) Patent No.: US 7,856,966 B2
(45) Date of Patent: Dec. 28, 2010

(54) CONTROLLER FOR INTERNAL COMBUSTION ENGINE

(75) Inventor: Soichi Saitoh, Nagoya (JP)

(73) Assignee: Denso Corporation, Kariya (JP)

( * ) Notice: Subject to any disclaimer, the term of this patent is extended or adjusted under 35 U.S.C. 154(b) by 219 days.

(21) Appl. No.: 12/353,567

(22) Filed: Jan. 14, 2009

(65) Prior Publication Data
US 2009/0178656 A1    Jul. 16, 2009

(30) Foreign Application Priority Data
Jan. 15, 2008    (JP) ............................ 2008-005198

(51) Int. Cl.
*F02M 25/14*    (2006.01)
(52) U.S. Cl. .................... 123/575; 123/1 A; 123/467
(58) Field of Classification Search ................ 123/1 A, 123/575–577, 467
See application file for complete search history.

(56) References Cited

U.S. PATENT DOCUMENTS

| | | | | |
|---|---|---|---|---|
| 4,612,880 A | * | 9/1986 | Brass et al. ................. | 123/1 A |
| 4,844,717 A | * | 7/1989 | Croudace et al. ............. | 44/418 |
| 5,979,410 A | * | 11/1999 | Grieshaber .................. | 123/467 |
| 6,640,783 B2 | * | 11/2003 | Braun et al. ................. | 123/467 |
| 7,637,251 B2 | * | 12/2009 | Kuo et al. ................... | 123/435 |
| 2005/0028764 A1 | * | 2/2005 | Mitani et al. .............. | 123/90.15 |
| 2007/0095331 A1 | | 5/2007 | Ayame | |
| 2010/0049421 A1 | * | 2/2010 | Futonagane et al. ......... | 701/103 |

FOREIGN PATENT DOCUMENTS

| | | |
|---|---|---|
| JP | 2007-9903 | 1/2007 |
| WO | WO 2006/129198 | 12/2006 |

OTHER PUBLICATIONS

Bergström, Kjell, et al., "The New ECOTEC Turbo BioPower Engine from GM Powertrain—Utilizing the Power of Nature's resources", 28 Internationales Wiener Motorensymposium, 2007, 5 pages.

* cited by examiner

*Primary Examiner*—Erick Solis
(74) *Attorney, Agent, or Firm*—Nixon & Vanderhye PC

(57) ABSTRACT

When an estimated alcohol concentration is higher than a specified concentration, an operation time of an engine is cumulated to obtain an alcohol cumulative operating time (ACOT). When the ACOT exceeds a specified time and a feedback correction quantity of a fuel injection quantity exceeds a specified quantity, a computer estimates that a deposit quantity exceeds a permissible value to notify the driver to refuel a fuel tank with gasoline. After fueling with gasoline, a cleaning agent contained in the gasoline removes the deposit accumulated on a fuel injector. As a result, a variation in fuel injection quantity due to deposit on the fuel injector can be avoided, and a deterioration in exhaust gas emission and drivability can be avoided.

4 Claims, 5 Drawing Sheets

FIG. 4

| EXCESS AIR RATIO | | 1 | 0.85 | 0.8 | 0.75 | 0.7 | 0.68 |
|---|---|---|---|---|---|---|---|
| AIR-FUEL RATIO | GASOLINE 100% (ETHANOL 0%) | 14.70 | 12.50 | 11.76 | 11.03 | 10.29 | 10.00 |
| | ETHANOL 85% | 9.86 | 8.38 | 7.88 | 7.39 | 6.90 | 6.70 |
| | ETHANOL 100% | 9.00 | 7.65 | 7.20 | 6.75 | 6.30 | 6.12 |

CONTROLLER FOR INTERNAL COMBUSTION ENGINE

CROSS-REFERENCE TO RELATED APPLICATION

This application is based on Japanese Patent Application No. 2008-5198 filed on Jan. 15, 2008, the disclosure of which is incorporated herein by reference.

FIELD OF THE INVENTION

The present invention relates to a controller for an internal combustion engine capable of combusting any one of gasoline, alcohol, and blended fuel of gasoline and alcohol.

BACKGROUND OF THE INVENTION

Gasoline, alcohol, such as ethanol or methanol, and blended fuel of gasoline and alcohol are used as fuel for an internal combustion engine. JP-2007-9903A (WO-2006/129198A1) and JP-2007-146831A (US-2007/009533A1) show a fuel injection controller which estimates alcohol concentration of the fuel and corrects fuel injection quantity based on the estimated alcohol concentration.

Generally, cleaning agent is added to gasoline. As the alcohol concentration of the fuel increases, the function of the cleaning agent is deteriorated. When the alcohol fuel, such as alcohol or blended fuel, is used as fuel, deposit is easily accumulated at a vicinity of an injection port of a fuel injector. Hence, in a case that the alcohol fuel is used as the fuel, even if the fuel injection is corrected according to the alcohol concentration, when the accumulated deposit quantity is increased, a fuel injection characteristic of the fuel injector is varied, so that the fuel injection quantity deviates from a proper value. Thus, an exhaust emission and a drivability may be deteriorated.

However, in the conventional system, since the deposit quantity accumulated on the fuel injector can not be detected, an appropriate process is not performed promptly when the deposit quantity is increased.

SUMMARY OF THE INVENTION

The present invention is made in view of the above matters, and it is an object of the present invention to provide a controller that is able to determine a deposit quantity accumulated on a fuel injector due to the use of alcohol fuel.

According to the present invention, a controller for an internal combustion engine capable of combusting any one of gasoline, alcohol, and blended fuel of gasoline and alcohol as a fuel, the controller includes: an alcohol concentration determination means for estimating or detecting an alcohol concentration of the fuel; a feedback control means for feedback-correcting a fuel injection quantity based on an output of an exhaust gas sensor in such a manner that an air-fuel ratio of an exhaust gas agrees with a target air-fuel ratio. The exhaust gas sensor is disposed in an exhaust passage of the internal combustion engine.

The controller further includes a deposit quantity estimation means for estimating a deposit quantity accumulated on a fuel injector based on the alcohol concentration estimated or detected by the alcohol concentration determination means and a feedback correction quantity of the fuel injection quantity established by the feedback control means.

Generally, as the alcohol concentration becomes higher, the deposit is easily accumulated on the fuel injector. When the accumulated deposit quantity is increased, the fuel injection quantity is varied, so that the air-fuel ratio of the exhaust gas is also varied. Accordingly, the air-fuel-ratio feedback correction quantity is also varied. A deposit quantity accumulated on a fuel injector can be estimated based on the alcohol concentration and a feedback correction quantity of the fuel injection quantity. Thereby, the deposit quantity accumulated on the fuel injector can be detected so that an appropriate process can be performed promptly when the deposit quantity is increased.

BRIEF DESCRIPTION OF THE DRAWINGS

Other objects, features and advantages of the present invention will become more apparent from the following description made with reference to the accompanying drawings, in which like parts are designated by like reference numbers and in which:

FIG. 4 is a table showing a relationship between alcohol concentration, excess air ratio, and air-fuel ratio.

DETAILED DESCRIPTION OF EMBODIMENTS

An embodiment of the present invention will be described hereinafter.

Figure 1:
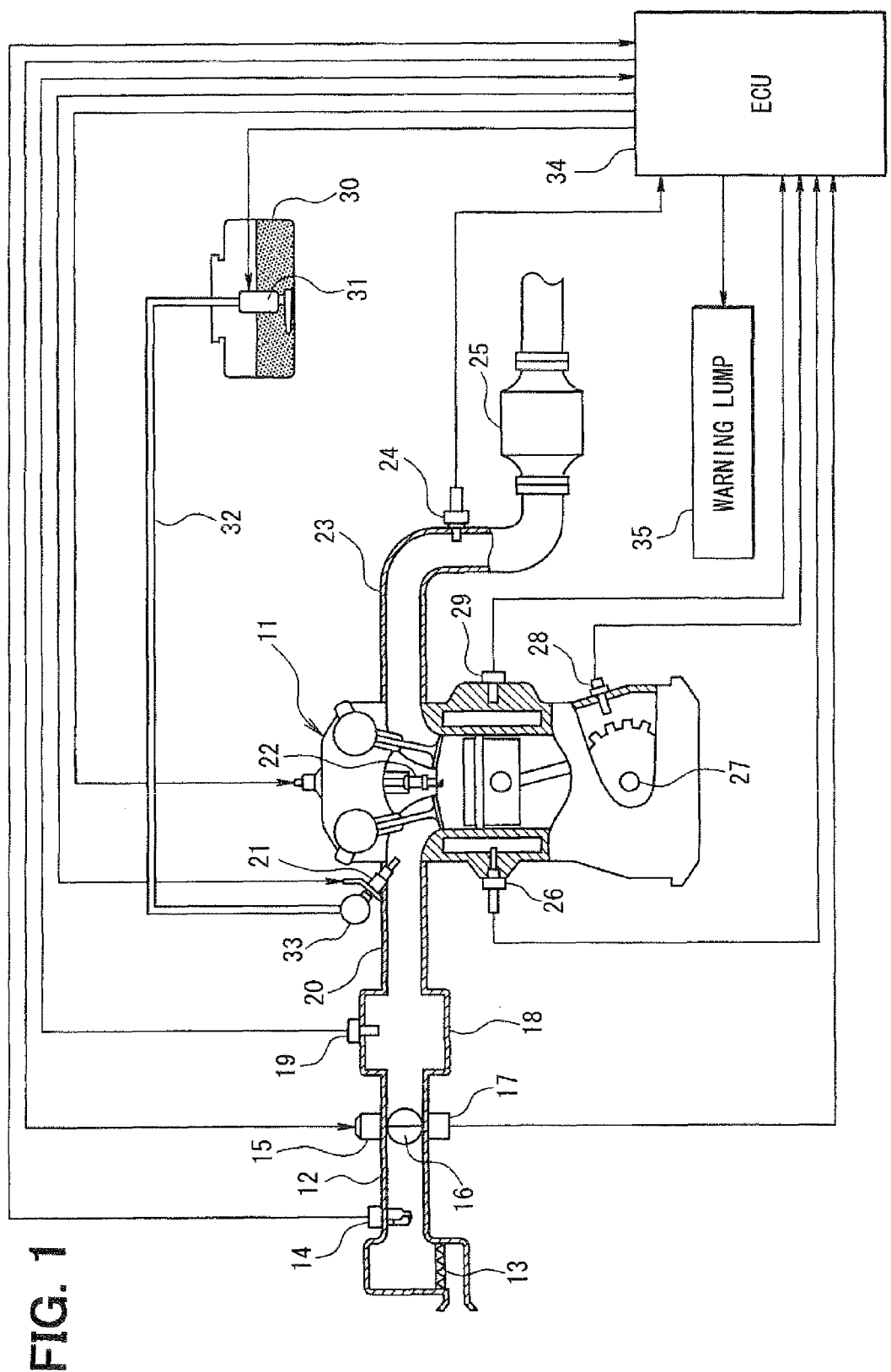
FIG. 1 is a schematic view of an engine control system according to an embodiment of the present invention.

Referring to FIG. 1, an engine control system is explained. An air cleaner 13 is arranged upstream of an intake pipe 12 of an internal combustion engine 11. An airflow meter 14 detecting an intake air flow rate is provided downstream of the air cleaner 13. A throttle valve 16 driven by a DC-motor 15 and a throttle position sensor 17 detecting a throttle position (throttle opening degree) are provided downstream of the air flow meter 14.

A surge tank 18 including an intake air pressure sensor 19 is provided downstream of the throttle valve 16. The intake air pressure sensor 19 detects intake air pressure. An intake manifold 20 which introduces air into each cylinder of the engine 11 is provided downstream of the intake pipe 12, and the fuel injector 21 which injects the fuel is provided at a vicinity of an intake port of the intake manifold 20 of each cylinder. A spark plug 22 is mounted on a cylinder head of the engine 11 corresponding to each cylinder to ignite air-fuel mixture in each cylinder.

An exhaust gas sensor (an air-fuel-ratio sensor, an oxygen sensor) 24 detecting an air-fuel ratio of the exhaust gas is provided in an exhaust pipe (an exhaust passage) 23. A three-way catalyst 25 purifying the exhaust gas is provided downstream of the exhaust gas sensor 24.

A coolant temperature sensor 26 detecting a coolant temperature and a knock sensor 29 detecting a knocking of the engine are disposed on a cylinder block of the engine 11. A crank angle sensor 28 is installed on a cylinder block to output crank angle pulses when a crank shaft 27 rotates a predetermined angle. Based on this crank angle pulses, a crank angle and an engine speed are detected.

The engine 11 can use gasoline, alcohol such as ethanol and methanol, or blended fuel of gasoline and alcohol. Any one of gasoline, alcohol, and blended fuel is supplied to the engine 11. A fuel pump 31 which pumps up the fuel is provided in a fuel tank 30 which stores the fuel. The fuel discharged from the fuel pump 31 is sent to the delivery pipe 33 through the fuel pipe 32, and is distributed to the fuel injector 21 of each cylinder from this delivery pipe 33.

The outputs of the sensors are inputted to an electronic control unit (ECU) 34. The ECU 34 includes a microcomputer which executes an engine control program stored in a Read Only Memory (ROM) to control a fuel injection quantity of a fuel injector 21 and an ignition timing of a spark plug 22 according to an engine running condition.

Figure 2:
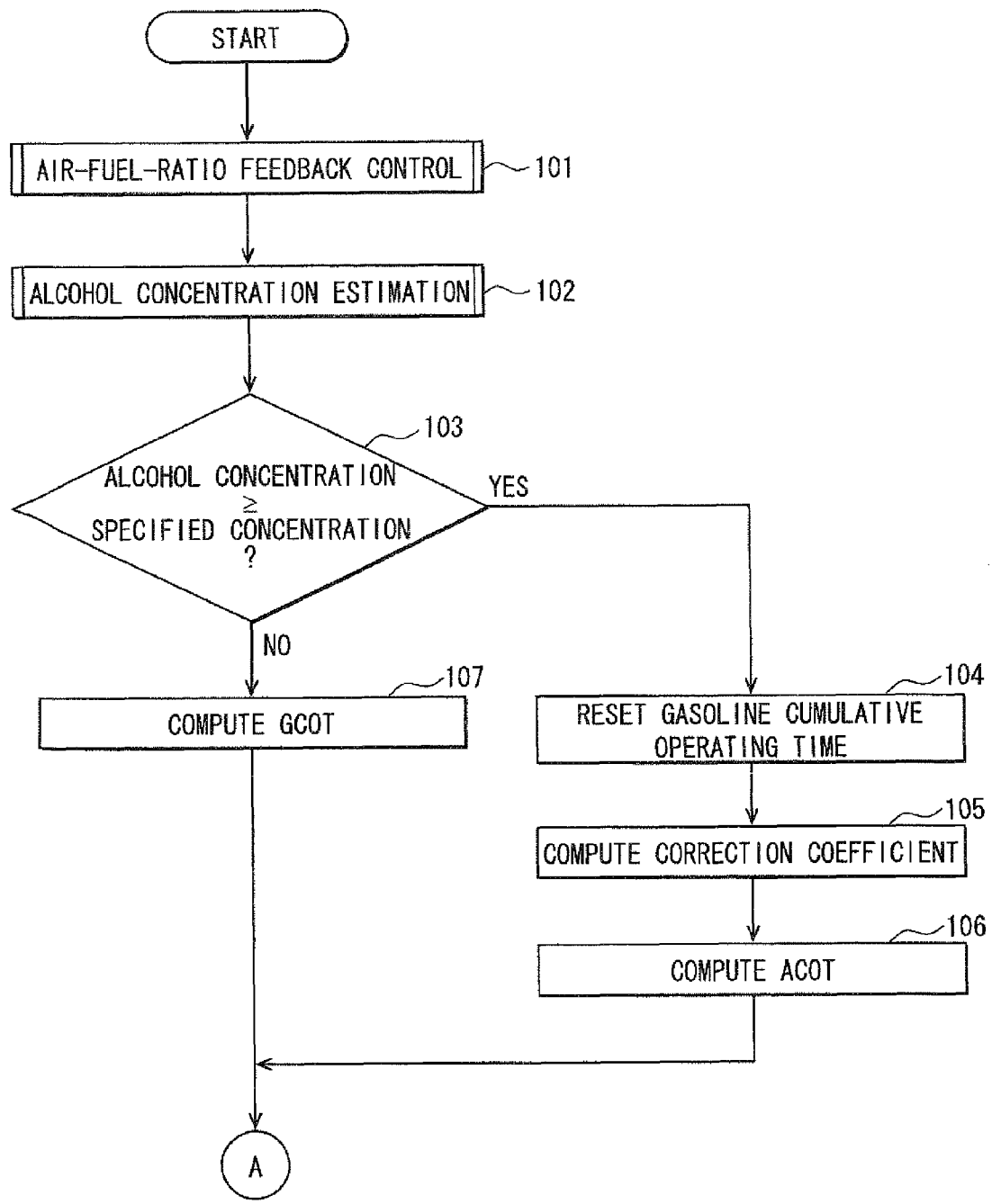
FIG. 2 and FIG. 3 are flowcharts showing a deposit quantity estimation routine.
Figure 3:
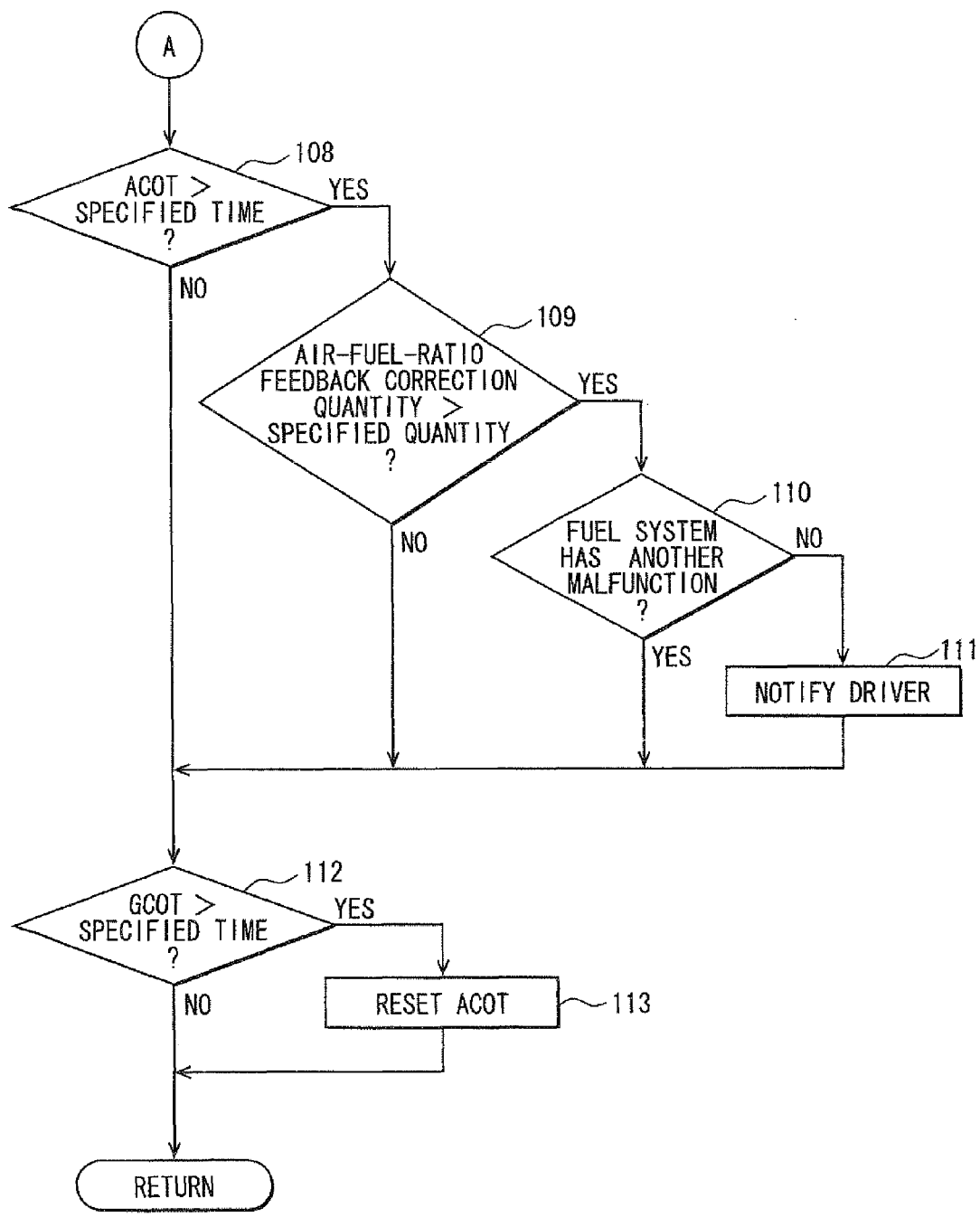

The ECU 34 executes routines shown in FIGS. 2 and 3. When an air-fuel-ratio feedback control execution condition is established after the engine is started, the ECU 34 computes an air-fuel-ratio feedback correction quantity so that an air-fuel ratio (excess air ratio) in the exhaust gas agrees with a target air-fuel ratio (target excess air ratio). The air-fuel-ratio feedback control is performed by use of the air-fuel-ratio feedback correction quantity in order to correct the fuel injection quantity.

In a specified time period after refueling, the alcohol concentration of the fuel is estimated based on the air-fuel-ratio feedback correction quantity. As shown in FIG. 4, gasoline and alcohol have different stoichiometric air-fuel ratio from each other. The stoichiometric air-fuel ratio represents an air-fuel ratio in which the excess air ratio is 1. When the alcohol concentration of the fuel is varied, the stoichiometric air-fuel ratio and the excess air ratio are varied. Accordingly, the output of the exhaust gas sensor 24 is varied to vary the air-fuel-ratio feedback correction quantity. Therefore, the alcohol concentration can be estimated based on the air-fuel-ratio feedback correction quantity. The alcohol concentration can be estimated based on at least one of deviation in air-fuel ratio, combustion stability (variation in engine speed), and engine torque.

Generally, cleaning agent is added to gasoline. As the alcohol concentration of the fuel increases, the function of the cleaning agent is deteriorated. When the alcohol fuel is used as the fuel, deposit is easily accumulated at a vicinity of the injection port of the fuel injector 21. When the accumulated deposit quantity is increased, fuel injection characteristic of the fuel injector 21 is varied, so that the fuel injection quantity deviates from a proper value. Thus, an exhaust emission and a drivability may be deteriorated.

The ECU 34 estimates the deposit quantity accumulated on the fuel injector 21 based on the estimated alcohol concentration and the air-fuel-ratio feedback correction quantity. When the estimated deposit quantity exceeds a permissible value, a warning lump 35 disposed on an instrument panel is turned on, or a display (not shown) indicates "Refuel with Gasoline" in order to notify the driver to refuel a fuel tank with gasoline. The permissible value is a maximum deposit quantity having little influence on the exhaust emission and the drivability.

Generally, as the alcohol concentration becomes higher, the deposit is easily accumulated on the fuel injector 21. When the accumulated deposit quantity is increased, the fuel injection quantity is varied, so that the air-fuel ratio of the exhaust gas is also varied. Specifically, when the accumulated deposit quantity is increased, the fuel injection quantity is decreased so that the air-fuel ratio becomes lean. Accordingly, the air-fuel-ratio feedback correction quantity is varied in such a manner as to exceed its variation due to an alcohol concentration variation. Therefore, the deposit quantity accumulated on the fuel injector 2 due to the use of alcohol fuel can be estimated based on the estimated alcohol concentration and the air-fuel-ratio feedback correction quantity.

In the present embodiment, when the estimated alcohol concentration is greater than a specified concentration (for example, 20%), the operation time of the engine 11 is accumulated and an alcohol cumulative operating time is obtained. The alcohol cumulative operating time represents the cumulative operation time of the engine 11 using a fuel of which alcohol concentration is greater than the specified concentration. The alcohol cumulative operation time is referred to as ACOT hereinafter. When the ACOT is greater than a specified time, and when the air-fuel-ratio feedback correction quantity exceeds a specified quantity, the computer estimates that the deposit quantity exceeds the permissible value. As the operation time of the engine 11 using high-alcohol-concentration fuel is prolonged, the deposit quantity accumulated on the fuel injector 21 is increased. Thus, the computer can determine whether the deposit quantity exceeds the permissible value based on the ACOT and the air-fuel-ratio feedback correction quantity.

Referring to FIGS. 2 and 3, a deposit quantity estimation routine will be described hereinafter.

The deposit quantity estimation routine shown in FIGS. 2 and 3 is executed at specified intervals while the ECU 34 is ON. In step 101, an air-fuel-ratio feedback control routine (not shown) is performed. When an air-fuel-ratio feedback control execution condition is established, the ECU 34 computes an air-fuel-ratio feedback correction quantity based on the output of the exhaust gas sensor 24 so that an air-fuel ratio in the exhaust gas agrees with a target air-fuel-ratio. The air-fuel-ratio feedback control is performed by use of the air-fuel-ratio feedback correction quantity in order to correct the fuel injection quantity of the fuel injector 21. The process in step 101 corresponds to an air-fuel-ratio feedback control means.

Then, the procedure proceeds to step 102 in which an alcohol concentration estimation routine (not shown) is performed. For example, according to the relationship shown in FIG. 4, the alcohol concentration of the fuel is estimated based on the air-fuel-ratio feedback correction quantity. The process in step 102 corresponds to an alcohol concentration determination means. The air-fuel-ratio feedback control routine and the alcohol concentration estimation routine can be performed at a specified interval that is different from the main routine.

Then, the procedure proceeds to step 103 in which the computer determines whether the estimated alcohol concentration is greater than or equal to the specified concentration (for example, 20%). The specified concentration is set at or around a lower limit of the alcohol concentration where the deposit is accumulated on the fuel injector 21.

When the answer is Yes in step 103, the procedure proceeds to step 104 in which a gasoline cumulative operating time is reset to an initial value "0". The gasoline cumulative operating time represents the cumulative operation time of the engine 11 using a fuel of which alcohol concentration is less than the specified concentration. The gasoline cumulative operation time is referred to as GCOT hereinafter.

Figure 5:
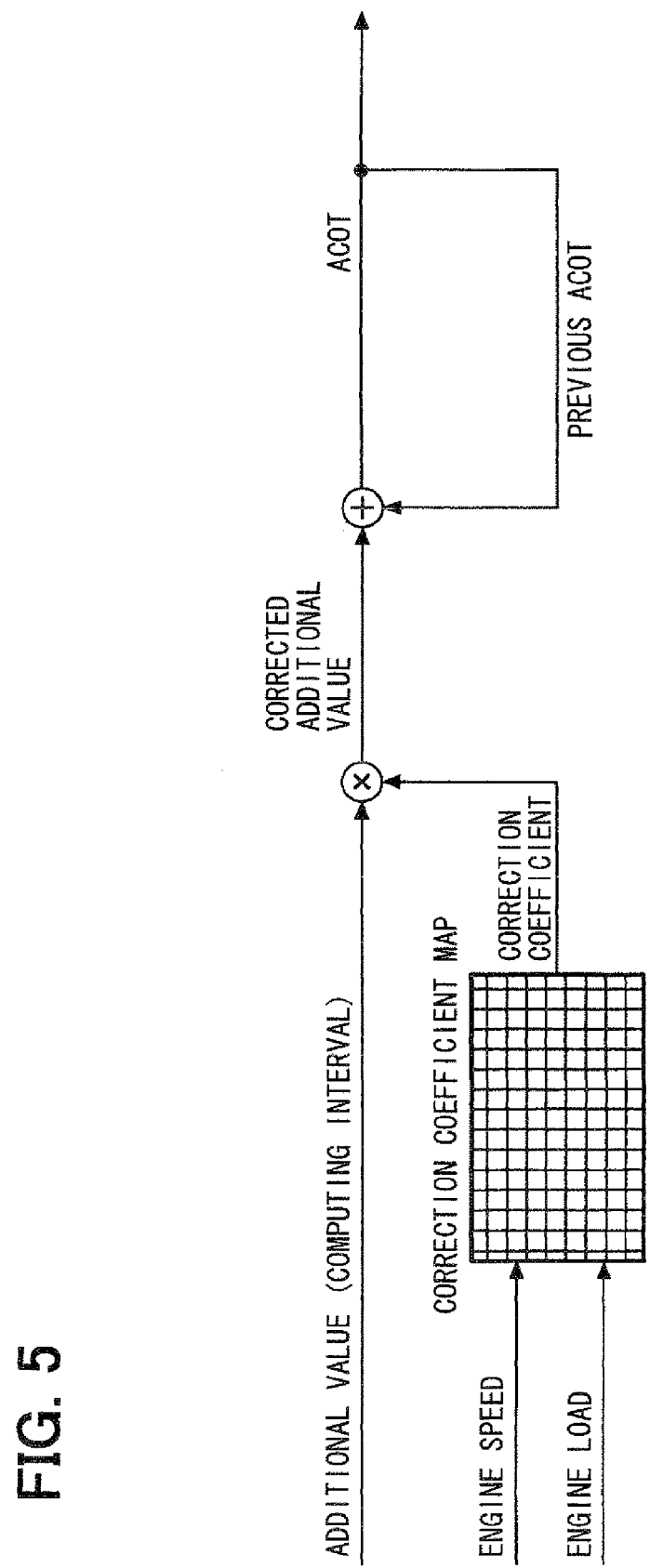
FIG. 5 is a block diagram for explaining a computing method of alcohol cumulative operating time.

Then, the procedure proceeds to step 105 in which a correction coefficient is computed based on the engine speed and engine load (for example, intake air flow rate or intake air pressure) by use of a correction coefficient map, as shown in FIG. 5. As the engine speed or the engine load is decreased, an intake air velocity becomes lower so that the deposit is easily accumulated on the fuel injector 21. On the other hand, as the engine speed or the engine load is increased, the intake air velocity becomes higher so that the deposit is hardly accumulated on the fuel injector 21. Considering such a characteristic, the correction coefficient is set to a maximum value "1" in a low-speed and low-load region. As the engine speed and the engine load become higher, the correction coefficient is set smaller. In a high-speed and high-load region, the correction coefficient is set to a minimum value "0".

Besides, there is a case where the deposit is easily accumulated with an increase in engine speed or engine load. In such a case, even if the engine speed or the engine load is high, the correction coefficient may be set to or close to the maximum value "1".

Then, the procedure proceeds to step 106 in which a specified additional value is multiplied by the correction coefficient to correct the additional value. The corrected additional value is added to the ACOT to update the ACOT. The specified additional value corresponds to a computing interval of the main routine. Accordingly, the ACOT is corrected based on the engine speed and the engine load. The processes in step 105 and 106 correspond to an alcohol cumulative operating time computing means.

When the answer is No in step 103, the procedure proceeds to step 107 in which the specified additional value is added to the &COT to update the GCOT.

Then, the procedure proceeds to step 108 in which the computer determines whether the ACOT exceeds the specified time. In step 109, the computer determines whether the air-fuel-ratio feedback correction quantity is greater than the specified quantity.

When the answers are Yes in steps 108 and 109, the procedure proceeds to step 110 in which the computer determines whether the fuel system has another malfunction. If another malfunction is not detected in the fuel system, the computer estimates the deposit quantity accumulated on the fuel injector 21 exceeds the permissible value. Then, the procedure proceeds to step 111 in which the warning lump 35 disposed on an instrument panel is turned on, or a display (not shown) indicates "Refuel with Gasoline" in order to notify the driver to refuel the fuel tank with gasoline. After refueling with gasoline, since gasoline or high-gasoline-concentration fuel is injected by the fuel injector 21, the cleaning agent contained in the gasoline removes the accumulated deposit from the fuel injector 21.

The processes in steps 108-110 correspond to a deposit quantity estimation means, and the process in step 111 corresponds to a warning means.

Then, the procedure proceeds to step 112 in which the computer determines whether the GCOT exceeds the specified time. When the answer is Yes in step 112, the computer determines that the accumulated deposit has been removed. The procedure proceeds to step 113 in which the ACOT is reset to "0".

According to the present embodiment described above, when the estimated alcohol concentration is higher than the specified concentration, the operation time of the engine 11 is cumulated to obtain the alcohol cumulative operating time (ACOT). When the ACOT exceeds the specified time and the air-fuel-ratio feedback correction quantity exceeds the specified quantity, the computer estimates that the deposit quantity accumulated on the fuel injector 21 exceeds the permissible value to notify the driver to refuel the fuel tank with gasoline. The driver is immediately prompted to refuel the fuel tank with gasoline. After refueling with gasoline, since gasoline or high-gasoline-concentration fuel is injected by the fuel injector 21, the cleaning agent contained in the gasoline removes the accumulated deposit from the fuel injector 21. As a result, a variation in fuel injection quantity due to deposit on the fuel injector 12 can be avoided, and a deterioration in exhaust gas emission and drivability can be avoided.

Furthermore, in the present embodiment, considering that an easiness of the deposit accumulation varies according to the engine speed and the engine load, the ACOT is corrected according to the engine speed and the engine load. Thus, an estimation accuracy of the deposit quantity by use of the ACOT can be improved.

The ACOT may be corrected based on any one of the engine speed and the engine load. The specified time for determining the ACOT may be corrected based on at least one of the engine speed and the engine load.

In the above embodiment, when the ACOT exceeds the specified time and the air-fuel-ratio feedback correction quantity exceeds the specified value, the computer estimates that the deposit quantity exceeds the permissible value to notify the driver to refuel the fuel tank with gasoline. Alternatively, the deposit quantity accumulated on the fuel injector 21 is estimated based on the ACOT and the air-fuel-ratio feedback correction quantity. When the estimated deposit quantity exceeds a permissible value, the computer notifies the driver to refuel the fuel tank with gasoline. The air-fuel-ratio feedback correction quantity may be corrected based on the estimated deposit quantity.

In the above embodiment, the alcohol concentration is estimated. Alternatively, the alcohol concentration may be detected by an alcohol concentration sensor.

The present invention is not limited to an intake port injection engine. The present invention can be applied to a direct injection engine or a dual injection engine.

What is claimed is:

1. A controller for an internal combustion engine capable of combusting any one of gasoline, alcohol, and blended fuel of gasoline and alcohol as a fuel, the controller comprising:
    an alcohol concentration determination means for estimating or detecting an alcohol concentration of the fuel;
    a feedback control means for feedback-correcting a fuel injection quantity based on an output of an exhaust gas sensor in such a manner that an air-fuel ratio of an exhaust gas agrees with a target air-fuel ratio, the exhaust gas sensor being disposed in an exhaust passage of the internal combustion engine; and
    a deposit quantity estimation means for estimating a deposit quantity accumulated on a fuel injector based on the alcohol concentration estimated or detected by the alcohol concentration determination means and a feedback correction quantity of the fuel injection quantity established by the feedback control means.

2. A controller for an internal combustion engine according to claim 1, further comprising:
    a warning means for notifying the driver to refuel a fuel tank with gasoline based on an estimation result of the deposit quantity estimation means.

3. A controller for an internal combustion engine according to claim 1, further comprising:
    a cumulative time computation means for computing an alcohol cumulative operating time that represents an cumulative operating time of the internal combustion engine in a case that the alcohol concentration is greater than a specified value, wherein
    the deposit quantity estimation means estimates the deposit quantity based on the alcohol cumulative operating time.

4. A controller for an internal combustion engine according to claim 3, wherein
    the cumulative time computation means corrects the alcohol cumulative operating time according to at least one of an engine speed and an engine load.

* * * * *